(12) United States Patent
Tu

(10) Patent No.: US 8,282,855 B2
(45) Date of Patent: Oct. 9, 2012

(54) COMPOSITE POSITIVE ACTIVE MATERIAL OF LITHIUM BATTERY AND METHOD FOR MANUFACTURING THE SAME

(75) Inventor: Yu-Ta Tu, Taipei (TW)

(73) Assignee: Vista Advance Technology Co., Ltd., Hsinchu County (TW)

( * ) Notice: Subject to any disclaimer, the term of this patent is extended or adjusted under 35 U.S.C. 154(b) by 331 days.

(21) Appl. No.: 12/781,869

(22) Filed: May 18, 2010

(65) Prior Publication Data

US 2011/0089368 A1   Apr. 21, 2011

(30) Foreign Application Priority Data

Oct. 16, 2009   (TW) ............................... 98135015 A

(51) Int. Cl.
*H01M 4/525* (2010.01)

(52) U.S. Cl. ............. 252/182.1; 252/519.1; 252/519.15; 252/519.32; 252/521.2

(58) Field of Classification Search ............... 252/182.1, 252/519.15, 519.32, 521.2, 519.1
See application file for complete search history.

(56) References Cited

U.S. PATENT DOCUMENTS

| | | | |
|---|---|---|---|
| 2003/0228514 A1* | 12/2003 | Tu et al. | 429/105 |
| 2006/0064868 A1* | 3/2006 | Tu | 29/623.5 |
| 2006/0143901 A1* | 7/2006 | Tu | 29/623.1 |
| 2006/0154146 A1* | 7/2006 | Kawasato et al. | 429/223 |
| 2006/0204845 A1* | 9/2006 | Chang et al. | 429/209 |
| 2006/0204850 A1* | 9/2006 | Ham et al. | 429/231.3 |
| 2006/0228627 A1* | 10/2006 | Nakayama et al. | 429/217 |
| 2007/0003835 A1* | 1/2007 | Hasegawa et al. | 429/231.95 |
| 2007/0015058 A1* | 1/2007 | Takezawa et al. | 429/231.95 |
| 2007/0099087 A1* | 5/2007 | Mihara et al. | 429/231.95 |
| 2007/0298321 A1* | 12/2007 | Jouanneau-Si Larbi et al. | 429/217 |
| 2008/0116423 A1* | 5/2008 | Fan et al. | 252/502 |
| 2008/0131780 A1* | 6/2008 | Kawasato et al. | 429/223 |
| 2008/0135802 A1* | 6/2008 | Saito et al. | 252/182.1 |
| 2008/0241693 A1* | 10/2008 | Fukuchi et al. | 429/231.1 |
| 2008/0299392 A1* | 12/2008 | Liu et al. | 428/403 |
| 2008/0311476 A1* | 12/2008 | Katai et al. | 429/231.8 |
| 2009/0101865 A1* | 4/2009 | Matsubara et al. | 252/182.1 |
| 2012/0132849 A1* | 5/2012 | Fan | 252/182.1 |

FOREIGN PATENT DOCUMENTS

TW   233231 B1 *   5/2005

* cited by examiner

*Primary Examiner* — Douglas Mc Ginty

(57) ABSTRACT

The composite positive active material of a lithium battery is composed of a main active material containing lithium and a sheathing active material containing lithium, whose particle diameter is far smaller than that of the main active material. A pulp containing these two active materials is sprayed and dried to form a mixed powder. The composite positive active material is obtained by means of sintering the mixed powder.

8 Claims, 2 Drawing Sheets

COMPOSITE POSITIVE ACTIVE MATERIAL OF LITHIUM BATTERY AND METHOD FOR MANUFACTURING THE SAME

BACKGROUND OF THE INVENTION

1. Technical Field

The invention generally relates to batteries, particularly to electrodes of lithium batteries.

2. Related Art

A lithium battery includes a positive electrode, a negative electrode and a separator between the two electrodes. A positive electrode is primarily made of an active material. The active material is mixed with conductive and binder to form a pulp. The pulp is spread on a collector which is a metallic film or net. In early years, $LiCoO_2$ was a primary material serving as a positive active material because it was easy to be made and its performance was sufficient. However, the price of cobalt kept increasing because of its rarity, so that this material has not been disadvantageous to industrial application. Therefore, some new materials featuring high performance and low cost has appeared in the market such as $LiNi_{1-x-y}Co_xMn_yO_2$ and $LiMn_2O_4$.

However, these new materials also have respective drawbacks. For example, the conductivity of $LiNi_{1-x-y}Co_xMn_yO_2$ is relatively low and its safety is suspectful. $LiMn_2O_4$ is very cheap, only about one fifth of $LiCoO_2$, but its capacity per gram is lower than $LiCoO_2$ by 10% and it has a problem of manganese ion leakage.

Taiwan patent No. I233231 provides a method for manufacturing a positive active material with a coat of nano-oxide. '231 discloses a positive active material and a metal oxide which is coated thereon and whose size is about 10 nm-100 nm. The method of '231 includes the steps of: (1) adding a surface modifier and aqueous solution containing $Mg(OH)_2$ into a precursor of positive material $Co_{0.2}Ni_{0.8}(OH)_2$; (2) uniformly coating the precursor $Co_{0.2}Ni_{0.8}(OH)_2$ with $Mg(OH)_2$ by heating to remove water; (3) mixing LiOH and the precursor obtained in step (2), and then sintering the mixture for about 16 hours. The nano-metal oxide coated on the positive material may increase safety of material and have high capacity per gram due to a thin interface of the non-electricity-storing active area. Also, the cyclic life may be extended and large current charge/discharge may be greater than ever.

According to the above prior art, we can find out a fact that a composite material can indeed enhance performance of the positive material. However, some drawbacks are still remained, for example:

(1) Adding salt solution containing cobalt, aluminum, zinc or magnesium requires a dewatering process, so that it is disadvantageous to rapidly implement the whole manufacturing process.

(2) For the active materials such as $LiCoO_2$, a great crystalline phase can be obtained only when a sintering process has been performed for a long time. However, the coating layer is hard to be formed because the coating material tends to diffuse into the coated material under the condition of high temperature and long time.

SUMMARY OF THE INVENTION

An object of the invention is to provide a composite positive active material and its manufacturing method, which can be rapidly generated and performed with maintaining the original property of the coating material and coated material.

To accomplish the above object, the invention provides a composite positive active material of a lithium battery. The active material is composed of a main active material containing lithium and a sheathing active material containing lithium, whose particle diameter is about 50-100 nm and far smaller than that of the main active material. A pulp containing these two active materials is sprayed and dried to form a mixed powder. The composite positive active material is obtained by means of sintering the mixed powder for a relatively short time.

DETAILED DESCRIPTION OF THE INVENTION

Figure 1:
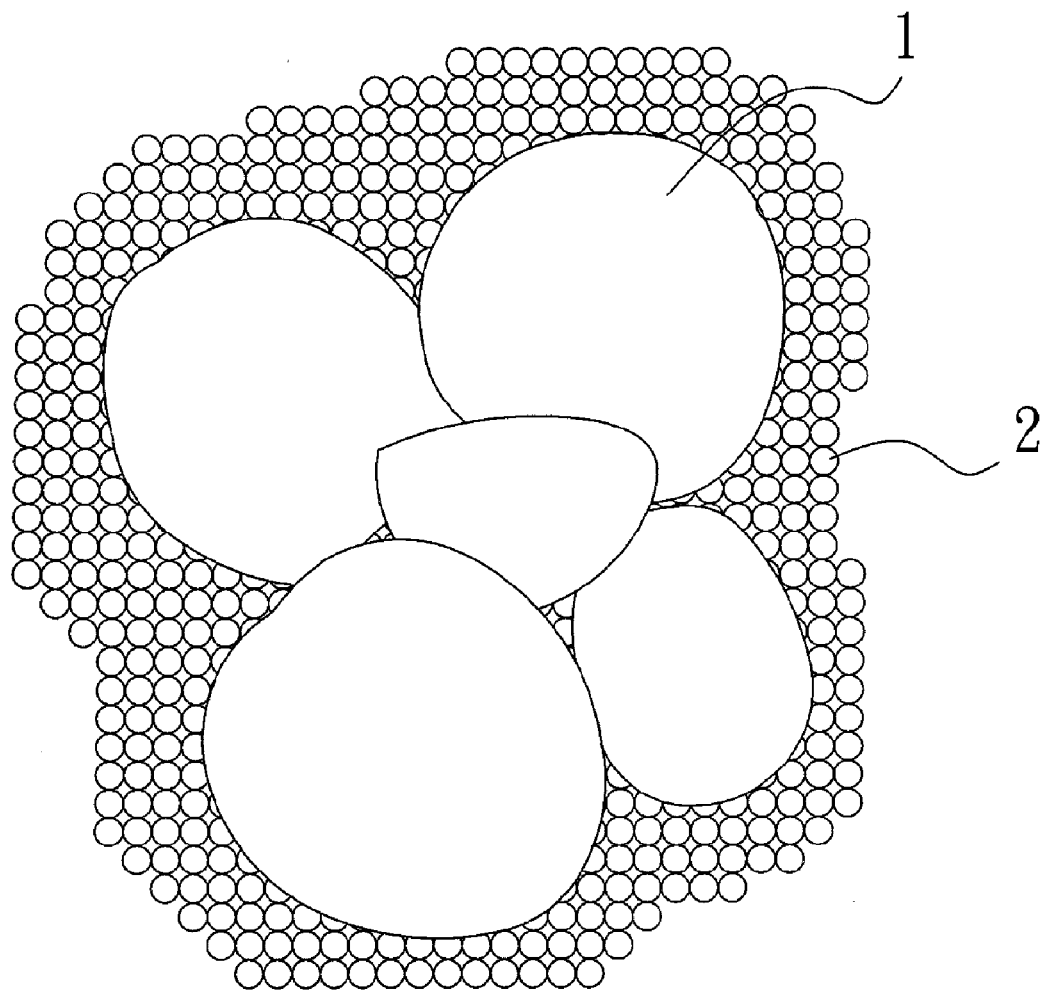
FIG. 1 shows a structure of the composite positive active material according to the invention.

Please refer to FIG. 1. The composite positive active material of a lithium battery according to the invention is composed of a main active material containing lithium 1 and a sheathing active material containing lithium 2, whose particle diameter is far smaller than that of the main active material. Each particle of the powder of main active material is attached by a plurality of particles of the powder of sheathing active material. A pulp containing these two active materials 1, 2 is sprayed and dried to form a mixed powder. The composite positive active material is obtained by means of sintering the mixed powder for a relatively short time. Each particle of the powder of main active material is attached by a plurality of particles of the powder of sheathing active material.

Figure 2:
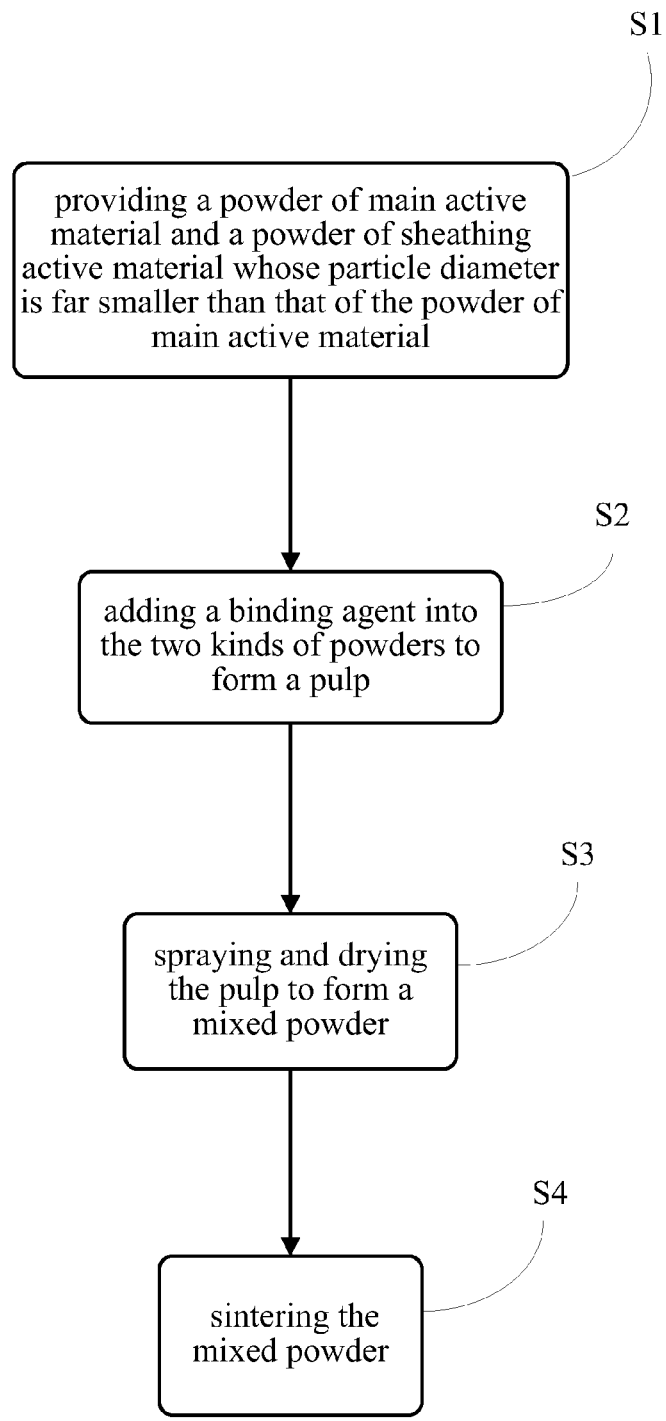
FIG. 2 is a flowchart of the manufacturing method according to the invention.

Please refer to FIG. 2. The method for manufacturing the composite positive active material includes the steps of:

S1) providing a powder of main active material containing lithium 1 and a powder of sheathing active material containing lithium 2, whose particle diameter is far smaller than that of the powder of main active material;

S2) adding a binding agent into the two kinds of powders to form a pulp;

S3) spraying and drying the pulp to form a mixed powder; and

S4) sintering the mixed powder for not longer than 5 hours.

[Embodiment 1: Coating $LiNi_{0.75}Co_{0.2}Mg_{0.05}O_2$ with $LiCoO_2$]

First, $LiCoO_2$ powder with particle diameter 50-100 nm and $LiNi_{0.75}Co_{0.2}Mg_{0.05}O_2$ powder with particle diameter 1-10 μm are provided to serve as the sheathing positive active material 2 and main positive active material 1, respectively. These two powder materials are in the weight ratio from 1:1 to 1:10. And a particle diameter of $LiNi_{0.75}Co_{0.2}Mg_{0.05}O_2$ powder is at least ten times as large as that of $LiCoO_2$ powder. A binding agent, which can preferably be Carboxymethyl Cellulose (CMC), is added into the materials to form a pulp after blending. The pulp is sprayed and dried by a spraying and drying machine to form a mixed powder with particle diameter 5-20 μm. Finally, the mixed powder is placed in a furnace to be sintered in a temperature range of 500 to 1000° C. and for a time period of 0.5 to 5 hour, in which sintering at 800° C. for 1 hour will be preferable.

[Embodiment 2: Coating $LiMn_2O_4$ with $LiCoO_2$]

First, $LiCoO_2$ powder with particle diameter 50-100 nm and $LiMn_2O_4$ powder with particle diameter 1-10 μm are provided to serve as the sheathing positive active material 2 and main positive active material 1, respectively. These two powder materials are in the weight ratio from 1:1 to 1:10. And a particle diameter of $LiMn_2O_4$ powder is at least ten times as large as that of $LiCoO_2$ powder. A binding agent, which can preferably be Carboxymethyl Cellulose (CMC), is added into the materials to form a pulp after blending. The pulp is sprayed and dried by a spraying and drying machine to form a mixed powder with particle diameter 5-20 μm. Finally, the mixed powder is placed in a furnace to be sintered at a temperature 800° C. for 1 hour.

What is claimed is:

1. A positive active material of a lithium battery comprising:
    a powder of main active material containing lithium; and
    a powder of sheathing active material containing lithium;
    wherein a particle diameter of the powder of main active material is at least ten times as large as that of the powder of sheathing active material, and each particle of the powder of main active material is sinteredly attached by a plurality of particles of the powder of sheathing active material.

2. The positive active material of claim 1, wherein the powder of sheathing active material containing lithium is $LiCoO_2$.

3. The positive active material of claim 1, wherein a particle diameter of the powder of sheathing active material containing lithium is about 50 to 100 nm, and that of the powder of main active material containing lithium is about 1 to 10 μm.

4. The positive active material of claim 1, wherein the powder of sheathing active material containing lithium and the powder of main active material containing lithium is in a weight ratio from 1:1 to 1:10.

5. A method for manufacturing a positive active material of a lithium battery, comprising the steps of:
    a) providing a powder of main active material containing lithium;
    b) providing a powder of sheathing active material containing lithium, whose particle diameter is smaller than that of the powder of main active material by one tenth or lower;
    c) adding a binding agent into the two powders to form a pulp;
    d) spraying and drying the pulp to form a mixed powder; and
    e) sintering the mixed powder.

6. The method for manufacturing a positive active material of claim 5, wherein the step d) is performed by a spraying and drying machine.

7. The method for manufacturing a positive active material of claim 5, wherein the step e) is performed in a temperature of 500 to 1000° C. and for a time period of 0.5 to 5 hours.

8. The method for manufacturing a positive active material of claim 5, wherein the binding agent in the step c) is Carboxymethyl Cellulose (CMC).

* * * * *